UNITED STATES PATENT OFFICE.

ALBERT WELLER, OF FRANKFORT-ON-THE-MAIN, GERMANY, ASSIGNOR TO VEREINIGTE CHININFABRIKEN ZIMMER & CO. GESELLSCHAFT MIT BESCHRÄNKTER HAFTUNG, OF SAME PLACE.

QUININ-CARBONIC ETHER AND PROCESS OF MAKING SAME.

SPECIFICATION forming part of Letters Patent No. 585,068, dated June 22, 1897.

Application filed April 2, 1896. Serial No. 585,952. (Specimens.)

*To all whom it may concern:*

Be it known that I, ALBERT WELLER, a subject of the Emperor of Germany, and a resident of Frankfort-on-the-Main, Germany, have invented certain new and useful Improvements in Preparations of Cinchona Alkaloids, of which the following is a specification.

A problem the solution of which has hitherto been unsuccessfully attempted is the obtainment of tasteless preparations of cinchona alkaloids. The bitter taste of these alkaloids and their salts has hitherto been a great objection to their use as medicines for internal absorption, and in certain cases, such as that of infants, it has rendered their employment impossible for this purpose. The means which have hitherto been tried to counteract this bitter taste have consisted in the addition of syrups, saccharin, glycyrrhizin, and the like or in the employment of certain salts of the cinchona alkaloids, either soluble with difficulty or totally insoluble, such as tannate of quinin. The former plan has not been successful because no preparation has hitherto been found to be capable of neutralizing or concealing the intensely-bitter taste which is the characteristic of the cinchona alkaloids, while although by the latter method it is feasible to obtain tasteless or but moderately-bitter preparations these are attended with the drawback that owing to their insolubility they are too slowly absorbed by the system and do not, therefore, allow the alkaloids to act in a sufficiently prompt and certain manner.

I have succeeded in preparing derivatives of quinin, as well as of other cinchona alkaloids, which are entirely free from any taste and are also dissolved in the stomach rapidly enough to insure a prompt absorption by the system. These preparations are obtained by converting the levogyrate alkaloids of the cinchona-bark, such as quinin and cinchonidin, into derivatives of carbonic acid—*i. e.*, into bodies in which the alkaloid rest has been reduced into one hydroxyl group of the hypothetical carbonic acid, $CO\begin{smallmatrix}OH\\OH,\end{smallmatrix}$ whereas the second hydroxyl group is either substituted by a single atom, like chlorin, or may be subjected to esterification by the introduction of an alcohol radical $CH_3, C_2H_5$, &c. All the said bodies can, therefore, be considered as derivatives of the corresponding alkaloid carbonic acids. Among these derivatives which have proved well are especially the chlorids (chlorids of quinin and cinchonidin carbonic acid) and the ethers of the same, (ethers of quinin and cinchonidin carbonic acid.) The said derivatives are prepared by treating the said alkaloids with the derivatives of the chlorocarbonic acid $CO\begin{smallmatrix}Cl\\OH,\end{smallmatrix}$ which latter is not known to exist in a free state.

I prefer to use the chlorid of the chlorocarbonic acid $CO\begin{smallmatrix}Cl\\Cl\end{smallmatrix}$ and the ethyl ether of the chlorocarbonic acid $CO\begin{smallmatrix}Cl\\OC_2H_5.\end{smallmatrix}$ The said two groups of derivatives of quinin and carbonic acid with which it is here proposed to deal in the first place are constituted as follows:

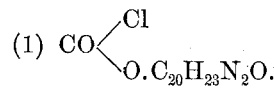

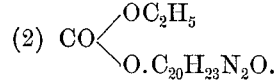

First. The preparation belonging to the first series is obtained by the action of phosgene (carbon oxychlorid) gas upon quinin in accordance with the following equation:

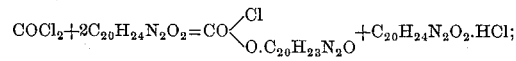

or it may be regarded as a derivative of the hypothetical chlorocarbonic acid $CO\begin{smallmatrix}Cl\\OH,\end{smallmatrix}$ wherein the quinin rest has passed into the hydroxyl group, and in that case it may be described as "chlorocarbonyl-quinin."

In preparing this compound the following course is adopted: Phosgene, either in the gaseous condition or dissolved in benzene, toluene, or some other suitable solvent, is caused to act upon quinin, which may be either in the solid state or suspended or dissolved in a suitable medium or vehicle and should preferably be dehydrated. The reaction will proceed most smoothly at a low temperature, and the development of heat, which would otherwise occur while the reaction is in progress, may be counteracted by cooling. The required combination will take place also where the normal or a higher temperature prevails, but then at the same time more or less colored by-products will form more readily. Or in some cases it may be advisable to operate under pressure, say, in a closed vessel fitted with a stirrer, when the temperature may be either lowered or raised, according to circumstances.

The following will serve as an example to illustrate how the process can be carried out: 6.5 kilograms of anhydrous quinin are gradually introduced into thirty kilograms of benzene solution, containing twelve per cent. (12%) of phosgene gas, which solution is maintained at a low temperature by cooling with cold water or ice. The mixture undergoing reaction presently assumes the form of a yellowish magma. After the whole of the quinin has been incorporated in it and when the reaction is completed the mixture is allowed to rest for a time, after which the phosgene gas which has not been taken up by the reaction is removed by suction, evaporation, or, if preferred, by distillation or by any other suitable means. While it is not absolutely necessary to employ such a large quantity of phosgene gas in excess, it is expedient to do so in practice, owing to the great volatility of that gas.

Upon the completion of the foregoing operations the crystalline mass is filtered, washed with benzene, dried, and digested with water for the purpose of eliminating the muriate of quinin which has formed. The residue, which dissolves in water with difficulty, is crystallized out of strong alcohol or any other suitable solvent. Further small quantities of the body may be extracted upon allowing the benzol mother liquor to evaporate and treating the residue remaining after evaporation in the manner hereinbefore described.

The analysis of chlorocarbonyl-quinin led to the following result:

| Calculated for $CO{<}^{C_{20}H_{23}N_2O_2}_{Cl}$ | Found. |
|---|---|
| Per cent. | Per cent. |
| C ...... 65.20 | C ...... 65.22 |
| H ...... 5.95 | H ...... 5.96 |
| Cl ...... 9.18 | Cl ...... 9.12 |
| N ...... 7.24 | N ...... 7.34 |

Chlorocarbonyl-quinin crystallizes out of alcohol in delicate colorless and perfectly tasteless needles, melting at from 187° to 188° centigrade and soluble with difficulty in water, ether, and cold alcohol, but readily soluble in chloroform and boiling alcohol. It is far less basic than quinin, its aqueous solution being of perfectly neutral reaction, though it does dissolve in acids, in combining with which it forms salts. From these solutions the alkaloid is separated again by means of alkalies.

The solution in diluted sulfuric acid has a blue fluorescence, and, like quinin, this body gives the thalleioquin reaction.

Second. The bodies appertaining to the second group are best obtained by causing alkyl ethers of chlorocarbonic acid or chloroformic acids as such or dissolved in a suitable solvent to act upon quinin, which may or may not be anhydrous and may be either dissolved or suspended in a suitable medium. The reaction takes place in accordance with the following equation:

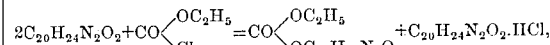

or on corresponding lines if instead of chloroformic ethyl ether chloroformic methyl ether or any of the other ethers of chloroformic acid be used. The preparations obtained may be considered as ethers of quinin-carbonic acid. The following directions may with advantage be observed in the preparation of, say, the ethyl ether of quinin-carbonic acid:

Five kilograms of anhydrous quinin are gradually added to a solution of 1.8 kilograms of chloroformic ethyl ether in twenty kilograms of benzene. The reaction takes place without any application of external heat. The mixture is then allowed to stand for several hours. Then the crystalline mass is filtered, the muriate of quinin is eliminated by means of water, and the residue is crystallized out of diluted alcohol. After the evaporation of the benzene a further supply of the body may be extracted from the benzene mother-lye. The quinin-carbonic ether may be obtained also at a higher temperature than that indicated and, if desired, under pressure or with the addition of a surplus of chloroformic ether, whereby the whole quantity of the quinin employed in the reaction is converted into the quinin-carbonic ether. The formation of muriate of quinin in the course of the reaction defined above may also be obviated and the entire quantity of quinin may be caused to pass into the novel combination, a quantity of a base equivalent to that of the quinin employed being allowed to participate in this reaction:

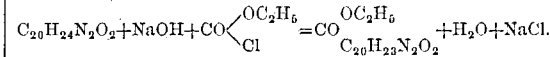

For this purpose five kilograms of quinin are dissolved in ten kilograms of strong alcohol, and to this solution 0.62 kilograms of pure caustic soda dissolved in their own weight of water are added. Then while the mixture is being energetically stirred and cooled 1.8 kilograms of the chloroformic ethyl ether are added.

When the reaction is completed, the sodium chlorid which has separated is filtered off, and the alcoholic solution is either distilled off or mixed with water, whereby quinin-carbonic ether is precipitated and finally crystallized out of diluted alcohol.

The ethyl ether of quinin-carbonic acid forms delicate white needles having their point of fusion at 95° centigrade and dissolving with difficulty in water, but being readily soluble in alcohol, ether, and chloroform. The substance is not bitter to the taste, its reaction upon litmus-paper being decidedly basic, while it has the property of forming salts by combining with acids. The fluorescence of the sulfuric acid and nitric acid solutions, like that of quinin, is blue. These solutions when brought into contact with the several alkaloid reagents yield precipitates, and the body obtained has the property of producing the thalleioquin reaction.

If the chloroformic ethyl ether be replaced by the corresponding methylether, quinin-carbonic methyl ether will be obtained, which closely resembles the first-mentioned ethyl derivative, but which will melt at 123° centigrade.

Third. Bodies constituted exactly like the quinin derivatives referred to in the preceding paragraphs 1 and 2 may be obtained also by means of cinchonidin if in the course of the processes hereinbefore described an equivalent quantity of cinchonidin be substituted for the quinin.

Chloro carbonyl-cinchonidin is obtained by the action of phosgene gas upon cinchonidin in accordance with the following equation:

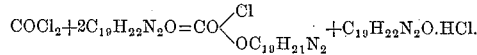

The method of proceeding to be adopted can be exactly the same as that described in paragraph 1, but, taking into account the minor equivalent weight of cinchonidin, 5.9 kilograms of this alkaloid only will be used.

Chloro carbonyl-cinchonidin forms colorless needles when crystallized out of alcohol and is absolutely free from taste. Its point of fusion is 191° centigrade. It is only soluble with great difficulty in water and ether, and it is difficult to dissolve it in cold alcohol, but it will readily dissolve in hot alcohol and chloroform.

The reaction of chloro carbonyl-cinchonidin is neutral, though it will dissolve in acid. The sulfuric-acid solution thereof does not present any fluorescence or give rise to the thalleioquin reaction.

Cinchonidin-carbonic ethers are obtained, like the analogous quinin preparations, by the action of chloroformic ethers upon cinchonidin—say, for instance, as expressed by the following equation:

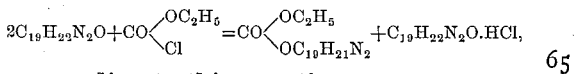

or according to this equation:

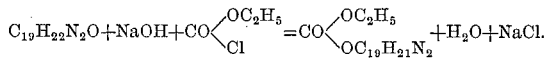

In preparing these ethers the methods described in paragraph 2 will answer the purpose very well, the only modification required being the substitution of 4.5 kilograms of cinchonidin for five kilograms of quinin.

Cinchonidin-carbonic ethyl-ether forms delicate white crystals having their melting-point at 85° centigrade. They dissolve with difficulty in water, but readily in alcohol, chloroform, and ether, and they are also easily soluble in acids, yielding non-fluorescent solutions. No thalleioquin reaction is obtainable with this body. It is not bitter to the taste, and its reaction upon litmus-paper is alkaline.

Both chlorocarbonyl-quinin and chlorocarbonyl-cinchonidin, as well as the quinin-carbonic and cinchonidin-carbonic ethers, respectively, and the salts thereof are suitable for use for medicinal purposes.

What I claim is—

1. The herein-described method of preparing pharmaceutical products by acting upon the levogyrate alkaloids of the cinchona-bark, with derivatives of the chlorocarbonic acid, substantially as and for the purpose set forth.

2. The herein-described method of preparing pharmaceutical products by acting upon the levogyrate alkaloids of cinchona-bark with an ether of chlorocarbonic acid, substantially as and for the purpose set forth.

3. The new pharmaceutical preparations, being derivatives of the levogyrate alkaloids of the cinchona-bark, crystallizing in tasteless white needles, soluble with difficulty in water and readily in chloroform, also readily soluble in acid and having, when quinin is used, the general formula:

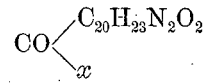

$x$ representing a single haloid atom or an alkyloxy group, substantially as and for the purpose set forth.

In testimony whereof I have signed my name to this specification in the presence of two subscribing witnesses.

ALBERT WELLER.

Witnesses:
WILHELM EITEL,
THEOPHIL KEZELMANN.